United States Patent
Nazari

(10) Patent No.: US 6,516,344 B1
(45) Date of Patent: Feb. 4, 2003

(54) REDUCING NETWORK TRAFFIC FOR REMOTE FILE SYSTEM ACCESSES BY KEEPING TRACK OF UNALLOCATED REGIONS IN FILES

(75) Inventor: Siamak Nazari, Arcadia, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/436,050

(22) Filed: Nov. 8, 1999

(51) Int. Cl.[7] .............................................. G06F 17/30
(52) U.S. Cl. ....................... 709/217; 709/216; 709/219; 709/231; 709/232; 707/10; 707/205; 707/206
(58) Field of Search .................................. 709/217, 203, 709/232, 216, 218, 219, 231, 205, 206, 10

(56) References Cited

U.S. PATENT DOCUMENTS

| | | | |
|---|---|---|---|
| 4,887,204 A | * 12/1989 | Johnson et al. | 707/10 |
| 5,452,447 A | * 9/1995 | Nelson et al. | 707/205 |
| 5,675,790 A | * 10/1997 | Walls | 707/205 |
| 5,745,748 A | * 4/1998 | Ahmad et al. | 707/10 |
| 5,893,116 A | * 4/1999 | Simmonds et al. | 707/201 |
| 6,230,200 B1 | * 5/2001 | Forecast et al. | 709/219 |

FOREIGN PATENT DOCUMENTS

EP    0 899 667 A2    3/1999

OTHER PUBLICATIONS

*Publication*, "UIO: A Uniform I/O System Interface for Distributed Systems", by David R. Cheriton, Stanford University, pp. 12 to 46, dated Feb. 1987.

* cited by examiner

*Primary Examiner*—Moustafa M. Meky
*Assistant Examiner*—Kevin Parton
(74) *Attorney, Agent, or Firm*—Pavel Pogodin; Park, Vaughan & Fleming LLP

(57) ABSTRACT

A system for reducing network traffic for remote file system accesses receives requests at a local computer system for access to a file on the remote server. If the request is a read operation, and the operation is directed to an unallocated region of the file on the remote server, the system returns a block of null values to the requestor without receiving the block of null values from the remote server. Otherwise, the system sends a request to the remote server to read from the file. If the request is a write operation, and the operation is directed to an unallocated region of the file on the remote server, the system sends a request to the remote server to allocate storage for the write operation. Next, the system writes the data into a local cache. Later, the system copies the data from the cache to the remote storage.

11 Claims, 4 Drawing Sheets

REDUCING NETWORK TRAFFIC FOR REMOTE FILE SYSTEM ACCESSES BY KEEPING TRACK OF UNALLOCATED REGIONS IN FILES

BACKGROUND

1. Field of the Invention

The present invention relates to file systems that are accessible across computer networks. More particularly, the present invention relates to a method and an apparatus for reducing network traffic for remote file system accesses by sending information specifying unallocated regions of files from a server to a client across a network.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access a file on a server computer system across a network. Such distributed file systems make it easy to manipulate files located on a remote server. However, if such distributed file systems are not designed carefully, they can easily generate unnecessary transfers across the network, which can degrade overall system performance.

Unnecessary transfers may be generated when a file is configured for random accesses. When a file is configured for random accesses, the blocks of the file can be accessed without linearly scanning through intervening blocks in the file. Configuring a file for random accesses allows the file to be created without first allocating storage on disk for blocks that make up the file. The blocks are eventually allocated as needed during subsequent file write operations.

Unnecessary data transfers are generated when an application performs a read operation from region that is not allocated within a file. Such a read operation will simply return null values (such as zeros) indicating that the requested region of the file has not been allocated. Hence, returning such null values creates unnecessary data transfers across the network. For example, if an application makes a request to read an 8K block of a file located on a remote server and the block is unallocated, the remote server will return a number of packets containing null values across the network to the client. These packets will take up valuable network bandwidth and will cause a number of corresponding interrupts on the client in order to process the packets. These interrupts can be particularly time-consuming for an application on the client, because the application must typically save state in order to service each interrupt. Note that most of this overhead is wasted because only null values are being transferred across the network.

What is needed is a method and apparatus for accessing a file located on a remote server that does not generate unnecessary overhead in processing accesses to unallocated regions within the file.

SUMMARY

One embodiment of the present invention provides a system for reducing network traffic for remote file system accesses by receiving information specifying unallocated regions within a file from a remote server. The system operates by receiving a request at a local computer system for an access to a file residing in storage on the remote server. If the request is a read operation, the system determines whether the read operation is directed to a region of the file that is presently unallocated in the storage on the remote server. If so, the system returns a block of null values to the requestor without receiving the block of null values from the remote server. If not, the system sends a request to the remote server to read the data from the file. If the request is a write operation, the system determines if the write operation is directed to a region of the file that is presently unallocated in the storage on the remote server. If so, the system sends a request to the remote server to allocate storage for the write operation in the storage on the remote server. Next, the system writes the data into a local cache for the file in the local computer system. At a later time, the system copies the data from the local cache to the storage in the remote server.

In one embodiment of the present invention, if there is no information stored on the local computer system regarding which regions of the file have been allocated, the local computer system determines whether the read operation is directed to a region of the file that is presently unallocated by forwarding the read operation to the remote server. If the read operation is directed to a region of the file that is presently allocated, the local computer system receives read data from the remote server. Otherwise, the local computer system receives information specifying which regions of the file have not been allocated.

In one embodiment of the present invention, before returning the block of null values to the requester, the system creates the block of null values in a local cache for the file in the local computer system and marks the block of null values as read only.

Another embodiment of the present invention operates by receiving an access to a file residing in a storage on the server. If the access is a read operation, the system determines whether the read operation is directed to a region of the file that is presently unallocated in the storage. If so, the system sends information to the remote client specifying regions of the file that have not been allocated in the storage. If not, the system reads the data from the file in the storage, and sends the data to the remote client.

In a variation on the above embodiment, if the access is a write operation directed to a region of the file that is presently unallocated in the storage on the server, the system allocates storage for the write operation in the storage on the server and waits for the data to be sent from the remote client.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
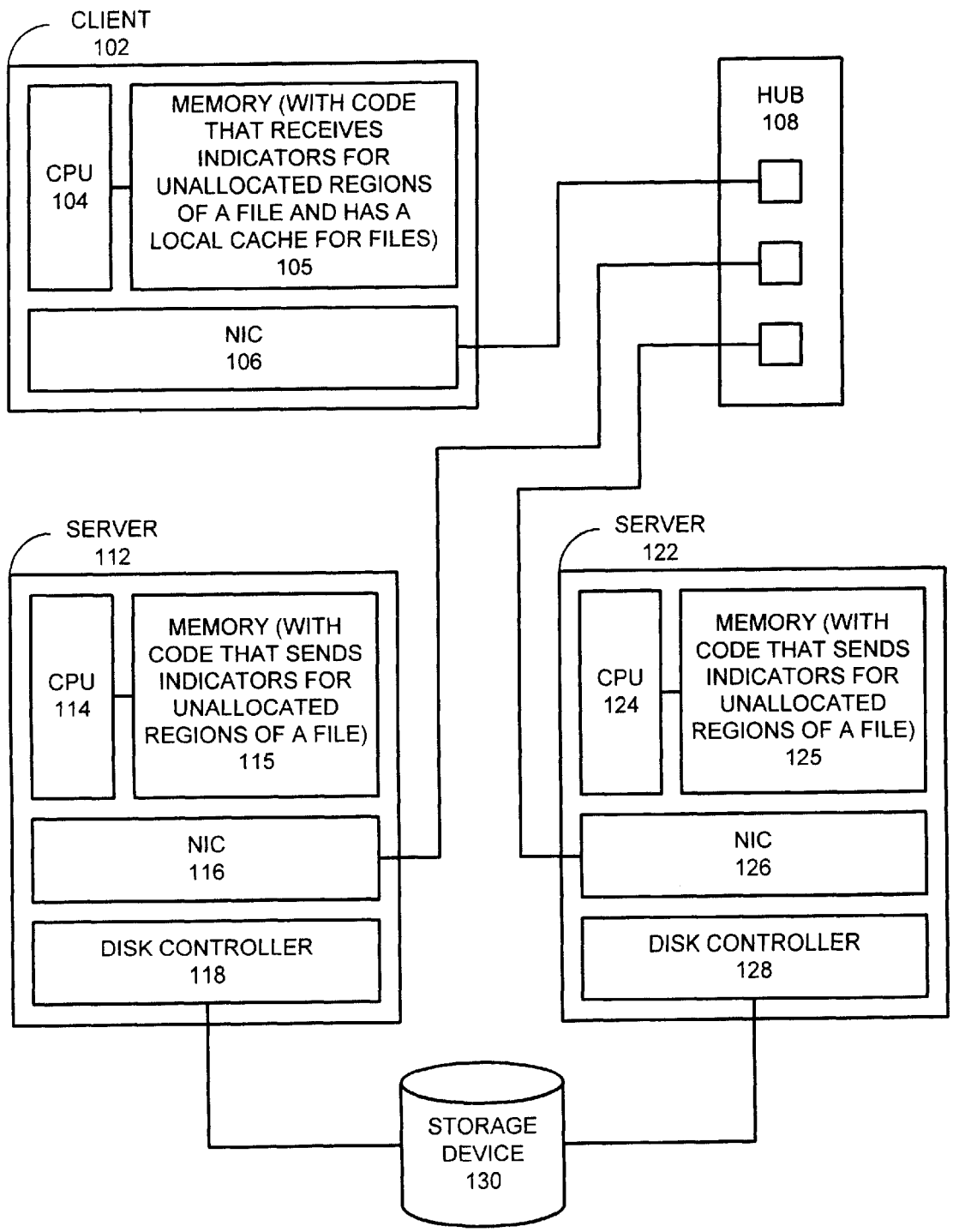
FIG. 1 illustrates a client computer system coupled to server computer systems in accordance with an embodiment of the present invention.

FIG. 1 illustrates client 102 coupled to servers 112 and 122 in accordance with an embodiment of the present invention. Client 102 may include any node on a network including computational capability and including a mechanism for communicating across the network. Note that although this disclosure describes a system including a single client 102, the present invention can generally be applied to computer systems with multiple clients. Servers 112 and 122 may include any node on a network including computational capability and data storage capability, as well as a mechanism for servicing requests from a client for computational and data storage resources.

Hub 108 implements a network that couples together client 102 and servers 112 and 122. Client 102 and servers 112 and 122 use hub 108 to communicate with each other. Hub 108 is a special case of a general network that can be used with the present invention. This general network can include any type of wire or wireless link between computers including, but not limited to, a local area network, a wide area network, or a combination of networks.

Note that client 102 is coupled to hub 108 through network interface controller (NIC) 106. Similarly, servers 112 and 122 are coupled to hub 108 through network interface controllers 116 and 126, respectively. Network interface controllers 106, 116 and 126 can include any type of interface for coupling client 102 and servers 112 and 122 with hub 108.

FIG. 1 also includes storage device 130, which is coupled to servers 112 and 122. Storage device 130 includes non-volatile storage for code and/or data and operates under control of servers 112 and 122. In one embodiment of the present invention, storage device 130 includes a disk drive.

Storage device 130 is coupled to disk controller 118 within server 112 and disk controller 128 within server 122. Disk controllers 118 and 128 include circuitry and software to control a number of disk spindles.

Client 102 includes central processing unit (CPU) 104. Similarly, servers 112 and 122 include CPUs 114 and 124. Central processing units 104, 114 and 124 can include any type of processing engines that can be used in a computer system, including, but not limited to, microprocessors, mainframe processors, device controllers and processing circuitry within appliances.

CPU 104 is coupled to memory 105, which includes code to implement a client portion of a file system in accordance with an embodiment of the present invention. CPUs 114 and 124 are coupled to memories 115 and 125, which include code to implement a server portion of a file system in accordance with an embodiment of the present invention. Memories 105, 115 and 125 include any type of random access memory containing code and/or data for CPUs 104, 114 and 124, respectively. Note that CPUs 104, 114 and 124 can be coupled to memories 105, 115 and 125 in a number of ways, including through a memory bus, through a bus bridge, or through a combined memory and I/O bus.

In the embodiment of the present invention illustrated in FIG. 1, servers 112 and 122 are fault-tolerant. For example, assume server 112 is the primary server and server 122 is the secondary server, if primary server 112 fails during a file system operation, secondary server 122 takes its place. Note, however, that the present invention can be applied to any type of distributed file system, and is not limited to fault-tolerant file systems.

In one embodiment of the present invention, the system illustrated in FIG. 1 operates under control of the SOLARIS™ MC operating system, which is a product of Sun Microsystems, Inc. of Palo Alto, Calif. The Solaris MC operating system is a UNIX-based operating system. Hence, in describing the present technology, UNIX terminology and concepts are frequently used. However, this usage is for purposes of illustration and is not to be construed as limiting the invention to this particular operating system.

Sun, the Sun logo, Sun Microsystems and Solaris are trademarks or registered trademarks of Sun Microsystems, Inc. in the United States and other countries.

Layered Architecture

Figure 2:
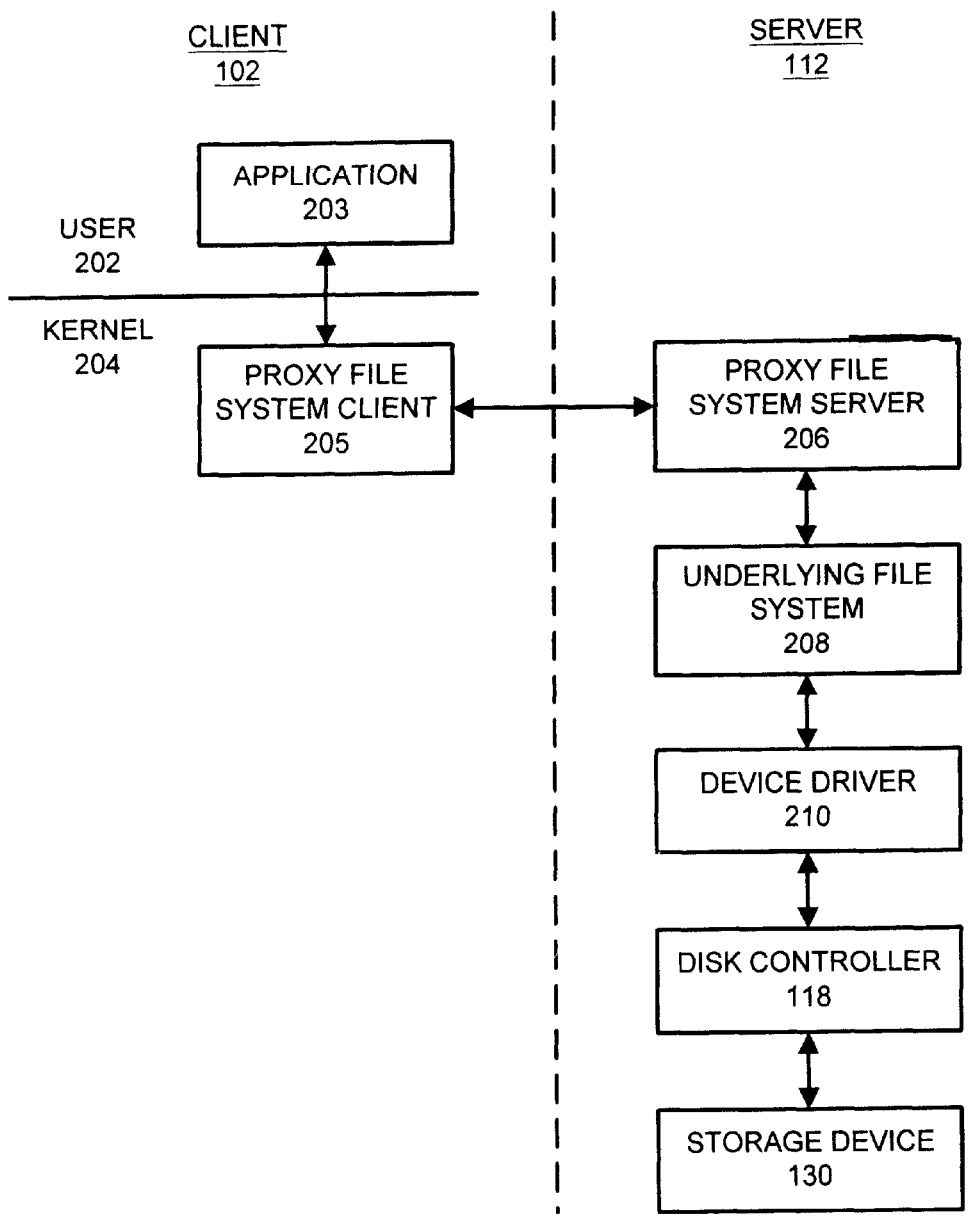
FIG. 2 illustrates a layered architecture for a distributed file system in accordance with an embodiment of the present invention.

FIG. 2 illustrates a layered architecture for a distributed file system in accordance with an embodiment of the present invention. The left-hand side of FIG. 2 illustrates layers that are present on a client side of the distributed file system. The right-hand side of FIG. 2 illustrates layers that are present on a server side of the distributed file system.

The client side of the distributed file system includes an application 203, which makes file system references. Application 203 operates in user space 202 and makes file system calls to proxy file system client 205 within kernel space 204. Proxy file system client 205 is the client-side portion of a distributed file system. Proxy file system client 205 communicates with proxy file system server 206 within server 122. Note that this communication takes place across a network through hub 108 from FIG. 1.

Proxy file system server 206 is the server-side portion of the distributed file system. Proxy file system server 206 communicates with underlying file system 208 on server 112.

Underlying file system 208 communicates with device driver 210, which contains code for communicating with disk controller 118 within server 112. Finally, disk controller 118 controls the operation of storage device 130.

File Structure

Figure 3:
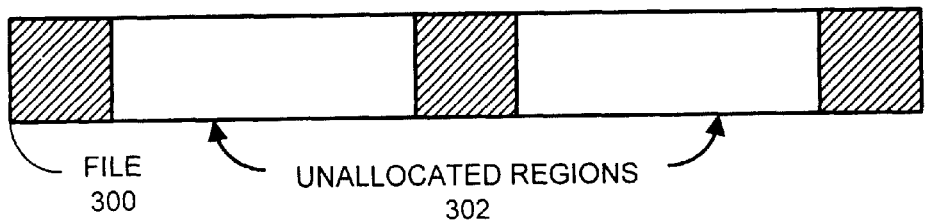
FIG. 3 illustrates a file containing unallocated regions in accordance with an embodiment of the present invention.

FIG. 3 illustrates a file 300 containing unallocated regions 302 in accordance with an embodiment of the present invention. When file 300 is initially created for random accesses, none of the regions of file 300 are allocated. As regions of file 300 are written to during execution of application 203, regions of file 300 become allocated (see shaded portions), and the other regions remain unallocated. Note that a file may include a number of contiguous unallocated regions separated by allocated regions.

Client Portion of File System

Figure 4:
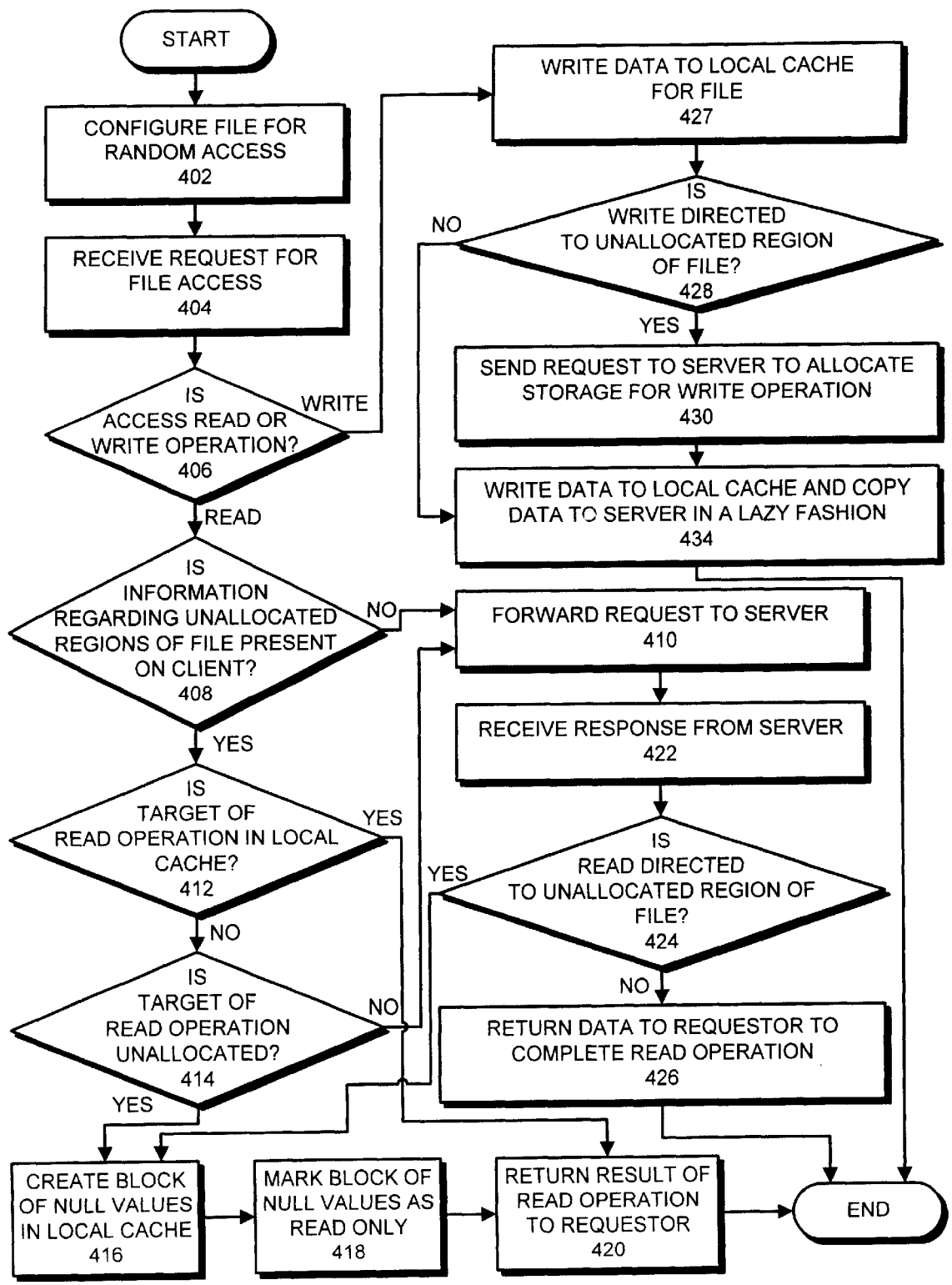
FIG. 4 is a flow chart illustrating operation of a client portion of a file system in accordance with an embodiment of the present invention.

FIG. 4 is a flow chart illustrating operation of a client portion of a file system in accordance with an embodiment of the present invention. The system starts by configuring file 300 for random access (step 402). This can be done with a special system call. For example, one embodiment of the present invention uses the MMAP system call within the Solaris MC operating system to configure file 300 for random access. This MMAP system call "memory maps" the system call so that it can be accessed randomly.

Next, the system receives a request from application 203 to perform an access to file 300 (step 404). This request results from application 203 performing a system call to perform a file system operation. In response to the request, the system determines whether the request is a read operation or a write operation (step 406).

If the request is a read operation, the system looks in local data structures for file 300 on client 102 to determine if the local data structures contain any information regarding which regions of file 300 are unallocated (step 408). If so, the system determines if the target of the read operation is present in a local cache (step 412). If not, the system determines if the read operation is directed to a region of file 300 that is presently unallocated (step 414). If the read operation is directed to a region of file 300 that is presently unallocated, the system creates a block of null values in the local cache (step 416) and marks the block of null values as read only (step 418). Next, the system returns the result of the read operation to the requestor (step 420).

If the target of the read operation is present in the local cache in step 412, the system proceeds directly to step 420 to return the result of the read operation to the requestor.

If local data structures on client 102 do not contain information regarding which regions of file 300 are allocated in step 408, or if the target of the read operation is allocated but not present in local cache in step 414, the system forwards the read operation to server 112 (step 410). After some period of time, client 102 receives a response from server 112 (step 422).

At the server 112, if the read operation is directed to a region of file 300 that is unallocated, server 112 returns information regarding which regions of file 300 are unallocated. (This is illustrated in step 508 of FIG. 5) In one embodiment of the present invention, this information is in the form of a linked list, wherein each element in the linked list specifies an offset and a length of a contiguous unallocated region of file 300 (otherwise known as a "hole"). If the read operation is directed to a region of file 300 that is allocated, server 112 simply returns data read from the region file 300. (This step is illustrated in steps 510 and 512 of FIG. 5)

The system determines from the information returned from server 112 if the read operation is directed to an unallocated region of file 300 (step 424). If the read operation is directed to an unallocated region, the system proceeds to step 416 above to create a block of null values in the local cache. Otherwise, the system returns the data from server 112 to the requestor to complete the read operation (step 426).

In the case of a write operation, the system writes data to the local cache for file 300 (step 427). In doing so, the system determines if the write operation is directed to an unallocated region of file 300 (step 428). If so, client 102 sends a request to server 112 to allocate storage for the write operation (step 430). Allocating storage for the write operation ensures that storage device 130 contains enough storage for the write operation. Next, the system writes data to the local cache for file 300 and eventually copies the data back to storage device 130 through server 112 in a lazy manner (step 434). This lazy copying may be triggered by periodic file system flush operation, an explicit file system flush operation or during a distributed file system invalidation operation.

If the write is directed to a region of file 300 that is allocated, the system skips directly to step 434 to copy the data back to storage device 130 through server 112 in a lazy manner.

Server Portion of File System

Figure 5:
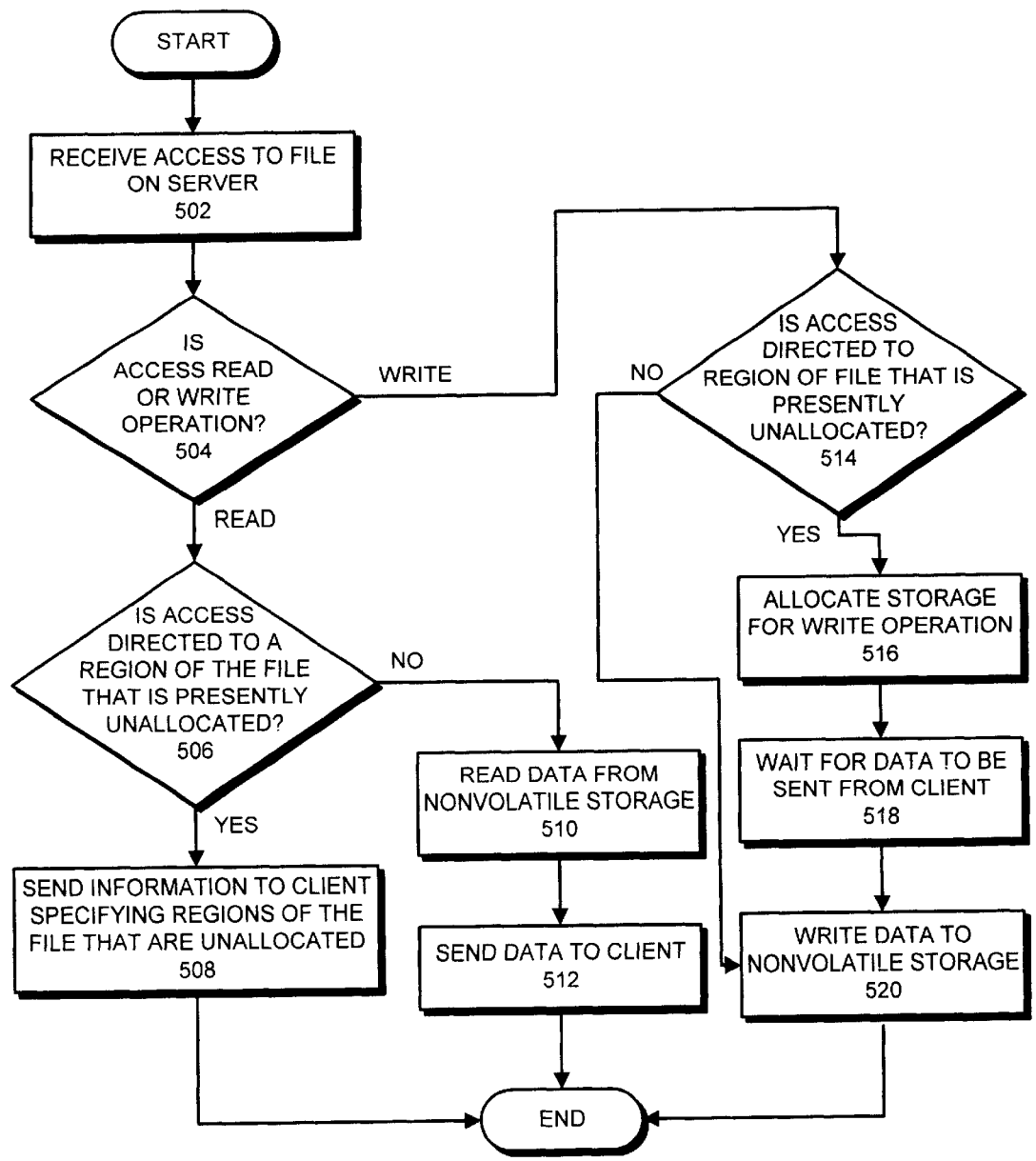
FIG. 5 is a flow chart illustrating operation of a server portion of a file system in accordance with an embodiment of the present invention.

FIG. 5 is a flow chart illustrating operation of a server portion of a file system in accordance with an embodiment of the present invention. The server portion of the file system first receives an access to file 300 on server 112 (step 502). Server 112 determines if the access is a read operation or a write operation (step 504).

If the access is a read operation, server 112 determines if the read operation is directed to a region of file 300 that is presently unallocated. If so, server 112 sends information to client 102 specifying regions of file 300 that are unallocated (step 508). Otherwise, the read operation is directed to an allocated region of file 300. In this case, server 112 reads the requested data from storage device 130 (step 510), and sends the data to client 102 (step 512).

If the access is a write operation, server 112 determines if the write operation is directed to a region of file 300 that is presently unallocated (step 514). If so, server 112 allocates storage for the write operation (step 516) and waits for the write data to be eventually sent from client 102 to server 112 in a lazy manner (step 518). When the write data is eventually received at server 112 (or if the access is directed to a region of the file that is presently allocated in step 514), the data is written into nonvolatile storage within storage device 130 to complete the write operation (step 520).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for reducing network traffic for remote file system accesses by sending information specifying unallocated regions within a file from a server to a remote client, the method comprising:

receiving, at the server, an access to a file residing in storage on the server;

if the access is a read operation to read data from the file, determining whether the read operation is directed to a region of the file that is presently unallocated in the storage;

if the read operation is directed to the region of the file that is presently unallocated, sending information to the remote client specifying regions of the file that have not been allocated in the storage; and if the read operation is directed to the region of the file that is presently allocated, reading the data from the file in the storage, and sending the data to the remote client.

2. The method of claim 1, wherein if the access is a write operation and the write operation is directed to a region of the file that is presently unallocated in the storage on the server, the method further comprises, allocating storage for the write operation in the storage on the server; and waiting for the data to be sent from the remote client.

3. The method of claim 1, further comprising configuring the file for random accesses prior to receiving the access.

4. The method of claim 1, wherein the file resides in nonvolatile storage on the remote server.

5. A apparatus that reduces network traffic for remote file system accesses by sending information specifying unallocated regions within a file from a server to a remote client, the apparatus comprising:

the server;

a storage within the server;

a receiving mechanism within the server that receives an access to a file residing in the nonvolatile storage; and a read operation processing mechanism within the server for reading data, the read operation processing mechanism being configured to, determine whether the read operation is directed to a region of the file that is presently unallocated in the nonvolatile storage, and send information to the remote client specifying regions of the file that have not been allocated in the nonvolatile storage if the read operation is directed to a region of the file that is presently unallocated.

6. The apparatus of claim 5, wherein the read operation processing mechanism is further configured to send the data from the file to the remote client if the read operation is directed to the region of the file that is presently allocated.

7. The apparatus of claim 5, further comprising a write operation processing mechanism for writing data that is configured to, allocate storage for the write operation in the nonvolatile storage on the server; and wait for the data to be sent from the remote client.

8. The apparatus of claim 5, further comprising a mechanism that configures the file for random accesses.

9. The apparatus of claim 5, wherein the storage within the server includes a nonvolatile storage.

10. A computer readable storage medium storing instructions that when executed by a computer cause the computer to perform a method for reducing network traffic for remote file system accesses by sending information specifying unallocated regions within a file from a server to a remote client, the method comprising:

receiving, at the server, an access to a file residing in a storage on the server;

if the access is a read operation to read data from the file, determining whether the read operation is directed to a region of the file that is presently unallocated in the storage;

if the read operation is directed to the region of the file that is presently unallocated, sending information to the remote client specifying regions of the file that have not been allocated in the storage; and if the read operation is directed to the region of the file that is presently allocated, and reading the data from the file in the storage.

11. The computer readable storage medium of claim 10, wherein if the access is a write operation, and the write operation is directed to a region of the file that is presently unallocated in the storage on the server, further comprising, allocating storage for the write operation in the storage on the server; and waiting for the data to be sent from the remote client.

* * * * *